United States Patent [19]

Whyte

[11] Patent Number: 5,513,437
[45] Date of Patent: May 7, 1996

[54] DOVETAIL TENON OFFSET CALIPER AND DOVETAIL TENON CONSTRUCTION METHOD

[76] Inventor: Edward V. Whyte, 711 N. 19th St., Boise, Id. 83702

[21] Appl. No.: 316,919

[22] Filed: Oct. 3, 1994

[51] Int. Cl.⁶ ............................................. G01B 5/14
[52] U.S. Cl. .................. 33/197; 33/806; 33/811; 33/542
[58] Field of Search ............................ 33/197, 783, 806, 33/542, 784, 791, 792, 794, 795, 796, 802, 809, 810, 811, 812

[56] References Cited

U.S. PATENT DOCUMENTS

| | | | |
|---|---|---|---|
| 1,656,143 | 1/1928 | Colby | 33/197 |
| 1,659,915 | 2/1928 | Hilfiker | 33/806 |
| 2,965,972 | 12/1960 | Hunt | 33/197 |
| 4,930,221 | 6/1990 | Taylor | 33/197 |

*Primary Examiner*—Christopher W. Fulton
*Attorney, Agent, or Firm*—Ormiston Korfanta Dunbar & Holland

[57] ABSTRACT

A dovetail tenon offset caliper includes a shoulder engagement member, a interior intersection point engagement member and a translation assembly for displacing the interior intersection point engagement member with respect to the shoulder engagement member to measure the offset necessary to construct a dovetail tenon to fit a particular dovetail mortise. The translation assembly is configured to displace the interior intersection point member with respect to the shoulder engagement member along a line substantially parallel to the mortise base to measure the perpendicular distance between a first plane perpendicular to the displacement line, the first plane containing the reference shoulder, and a second plane, parallel to the first plane and containing the intersection point, this distance being the dovetail tenon offset. The measured offset is used to position a dovetail cutting tool, such as a router bit. The offset equals the distance from the centerline of the board, or other stock to be cut, to the centerline of the cutting tool.

10 Claims, 10 Drawing Sheets

DOVETAIL TENON OFFSET CALIPER AND DOVETAIL TENON CONSTRUCTION METHOD

BACKGROUND OF THE INVENTION

1. Technical Field

This invention generally relates to mortise and tenon joints, and more particularly, this invention relates to a method and apparatus for constructing a dovetail tenon to fit a particular dovetail mortise.

2. Background

The dovetail mortise and tenon joint, also known as a diverging mortise and tenon joint, is a particularly desirable joint for perpendicularly joining one member along the length of another. However, because of the close tolerances necessary to construct this joint, it is seldomly used. When it is used, it is most often employed by the fine craftsmen woodworker to construct what is known as a sliding dovetail joint. A sliding dovetail joint allows the wood to expand or contract without the wood cracking and sacrificing either the integrity of the joint or the aesthetics of the end product.

Figure 1:
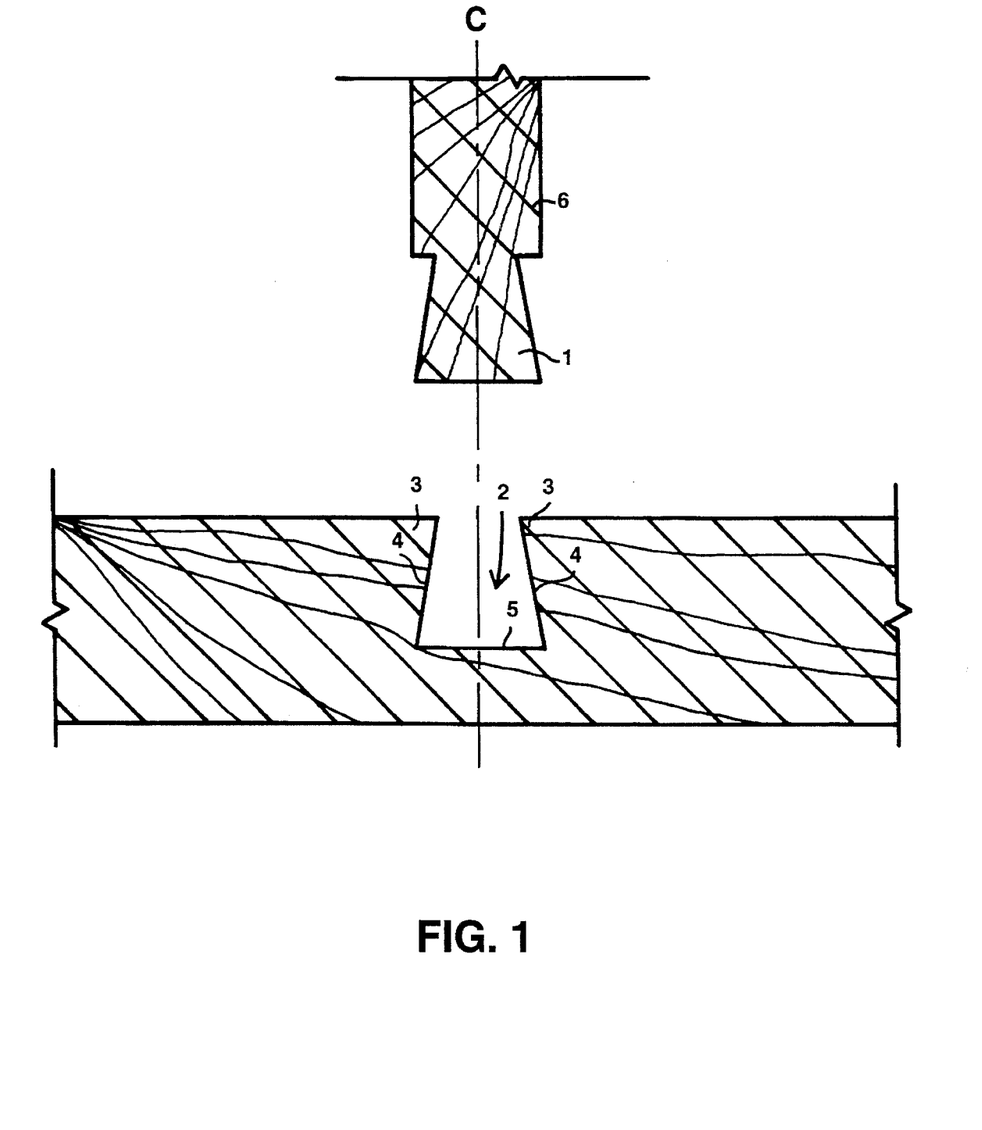
FIG. 1 shows in cross section, a typical dovetail tenon and mortise.

FIG. 1 of the drawings illustrates a typical dovetail mortise and tenon construction. The dovetail mortise or groove 2 has a pair of opposing shoulders 3 defining the mortise opening. A pair of walls 4 diverge downwardly from each shoulder edge. Each wall 4 terminates at the base 5 of mortise 2 forming an acute interior angle with respect to base 5.

The current method for constructing a dovetail mortise and tenon joint, is to first route or cut the dovetail mortise and then construct the dovetail tenon to fit the mortise. The dovetail tenon is cut using an iterative process, cutting away a little material at a time from each side of the tenon until the tenon closely fits the mortise. It is critical to match the depth, width and pitch of the tenon to the mortise. In the case of a fixed dovetail mortise and tenon joint, a tight friction fit between the tenon and mortise is desired. In the case of a sliding dovetail joint, the tenon can be lightly sanded to allow the tenon to slide in the mortise along the length of the mortise but not wobble in the lateral direction.

Unfortunately, for the common weekend woodworker, this joint construction is simply too complex and time consuming to use, at least employing current construction methods. Even for the experienced craftsman, this joint is time consuming to produce and consequently used only when it is necessary, or when using complex and expensive milling machines. What is needed is an efficient method for constructing a precise mortise and tenon joint without having to employ a complicated or expensive apparatus, such as a milling machine. Accordingly, it is an object of this invention to fulfill these needs by providing a simple, inexpensive apparatus which allows expedient manufacture of a precise dovetail mortise and tenon joint using common woodworking tools.

DISCLOSURE OF INVENTION

These objects, and others, are satisfied by a dovetail tenon offset caliper which includes a shoulder engagement member, a interior intersection point engagement member and a translation assembly for displacing the interior intersection point engagement member with respect to the shoulder engagement member. The device measures the required offset from a centerline of a board end necessary to construct a dovetail tenon to closely fit a particular dovetail mortise.

The shoulder engagement member has a shoulder engagement surface configured to closely engage one edge of the mortise opening, this edge being defined as a reference shoulder of the mortise opening. The interior intersection point engagement has an intersection point engagement surface configured to closely engage the intersection point which is the interior acute angle opposite the reference shoulder. Both the shoulder engagement member and the interior intersection point engagement member are carried by the translation assembly. The translation assembly is configured to displace the interior intersection point member with respect to the shoulder engagement member along a line substantially parallel to the mortise base. This displacement measures the perpendicular distance between a first plane perpendicular to the displacement line, the first plane containing the reference shoulder, and a second plane, parallel to the first plane and containing the intersection point, and the displacement is equal to the dovetail tenon offset.

The measured offset is used to position a dovetail cutting tool, such as a router bit. The offset equals the distance from the centerline of the board thickness, or other stock to be cut, to the centerline of the cutting tool.

A locking means is provided which cooperates with the translation assembly to lock the shoulder engagement member into place with respect to the interior intersection point engagement member.

BEST MODE FOR CARRYING OUT INVENTION

Referring now to FIGS. 1 through 8, a first embodiment of a dovetail tenon offset caliper 10 is shown, along with various illustrations portraying the construction of a dovetail tenon 1 according to the present invention.

Figure 8:
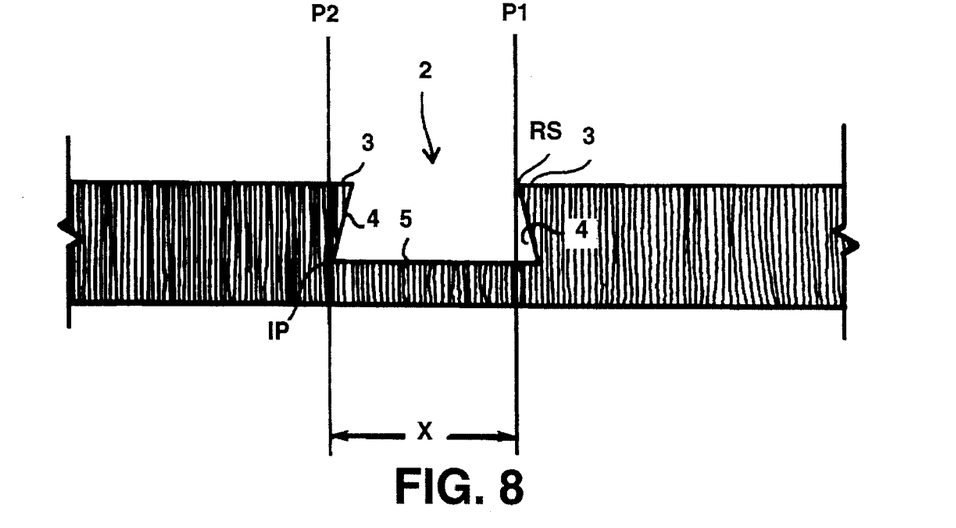
FIG. 8 is a side view of a dovetail mortise illustrating the various reference points and planes employed to carry out the invention.

Conceptually, the invention involves measuring the perpendicular distance between the reference shoulder, RS, and the interior intersection point, IP. For purposes of this explanation, "perpendicular distance" means the distance between two parallel planes P1 and P2, which are both perpendicular to base 5 of dovetail mortise 2. Plane P1 is positioned so that the edge opening of mortise 2 defined as reference shoulder, RS, is contained within plane P1. Similarly, plane P2 is positioned to contain interior intersection point IP. Conveniently, the inventor has found that the perpendicular distance, X, between planes P1 and P2 is exactly equal to the offset necessary to precisely construct a dovetail tenon 1 using a common cutting tool, T, such as a dovetail router bit. Here, the term "offset" refers to the distance from the center line of tenon stock 6 to the center of cutting tool T. This method assumes that the depth and pitch of mortise 2 is exactly equal to the height and pitch of tenon 1, at least within a reasonable degree of accuracy.

Figure 2:
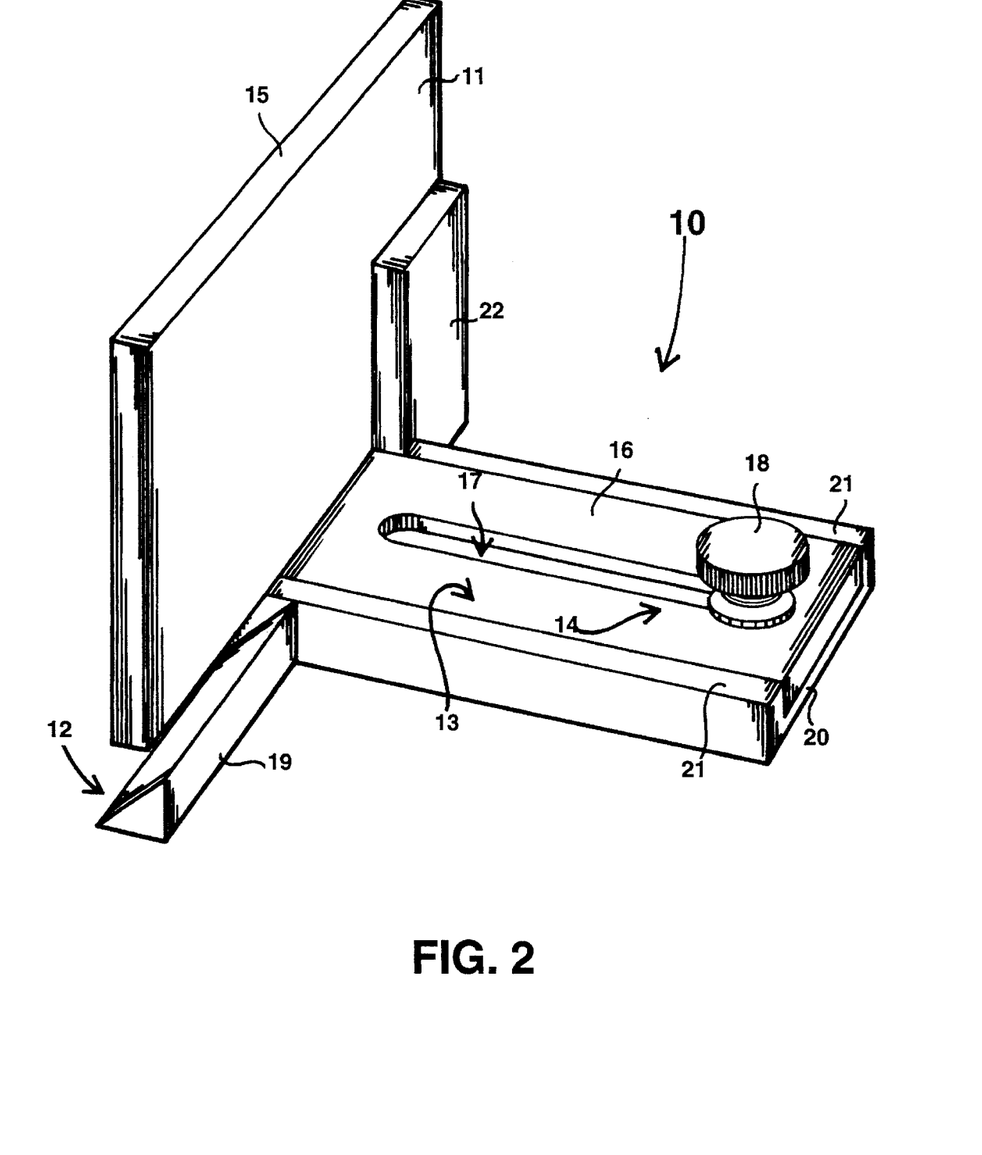
FIG. 2 shows a first embodiment of the dovetailed offset tenon caliper.
Figure 3:
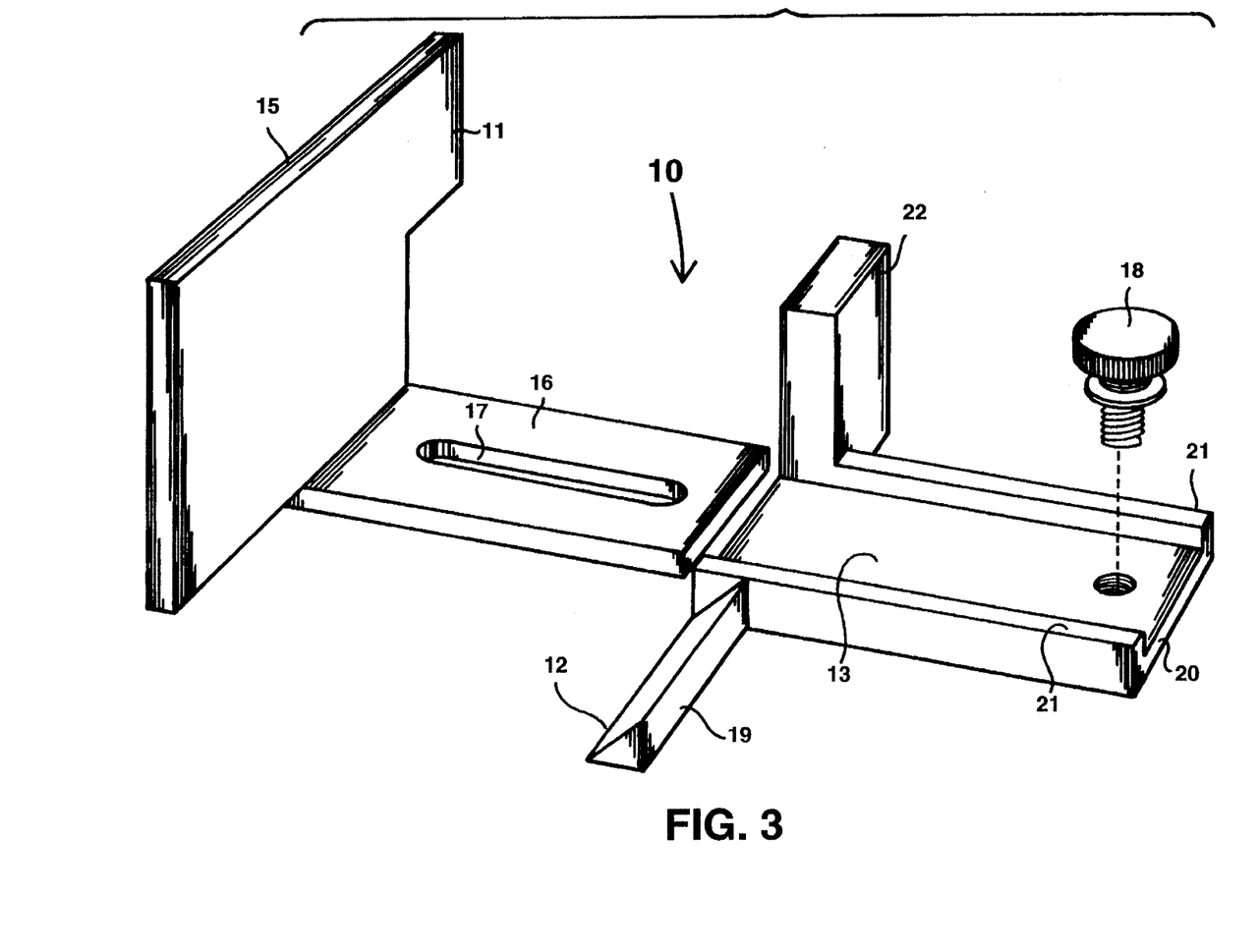
FIG. 3 shows an exploded view of the first embodiment of the dovetail caliper.

The currently preferred embodiment of the invention includes three basic elements which are here defined as shoulder engagement member 11, interior intersection point engagement member 12 and translation assembly 13.

Shoulder engagement member 11 of dovetail offset tenon caliper 10 is here shown as heel plate 15. Heel plate 15 includes a rear shoulder engagement surface for contact with the edge of reference shoulder RS.

The interior intersection point engagement member 19 of dovetail offset tenon caliper 10 is here shown as an elongated triangular toe arm 19. Toe arm 19 is beveled at an angle which is less than that of the interior angles found in normal dovetail mortises. This feature ensures that the forward most apex, shown as the left most point of toe arm 19, engages the interior intersection point IP of dovetail mortise 2.

The translation assembly 13 of dovetail offset tenon caliper 10 here includes a slide plate 16 which is slidably received by guide member 20. Slide plate 16 is perpendicularly attached to heel plate 15, or can be formed integrally therewith. An elongated slot 17 is formed along the longitudinal axis of slide plate 16 as a part of locking means 14, which will be explained below. Guide member 20 includes a pair of rails 21 formed along the longitudinal marginal edges of guide member 20 to form a receiving slot for slide plate 16. A threaded hole 23 is formed in the base of guide member 20 and disposed coincident elongated slot 17. Toe arm 19 extends laterally and perpendicularly out from the side of one of the rails 21 at the front edge of guide member 20. Similarly, a rest block 22 extends laterally out from the other rail 21 and is here positioned at the front end of guide member 20. Rest block 22 provides a convenient mass resting point for dovetail offset tenon caliper 10 which may help prevent accidental damage to the instrument.

A locking means 14 is provided to lock slide plate 16 in place with respect to guide member 20 to preserve the measured displacement between heel plate 15 and toe arm 19. Here, locking means 14 consists of a thumb screw 18, cooperating threaded hole 23, and elongated slot 17.

It should be noted that various modifications and configurations of shoulder engagement member 11, interior intersection point engagement member 12, translation assembly 13 and locking means 14 are possible. For example, translation assembly 13 could be virtually any assembly which is capable of displacing the interior intersection point member with respect to the shoulder engagement member, such as a traveler screw and cooperating carriage, pivoting arms or other slide and guide assemblies.

Additionally, locking means 14 could consist of a ratchet and pall locking mechanism, a cam lock or another friction locking mechanism.

Figure 4:
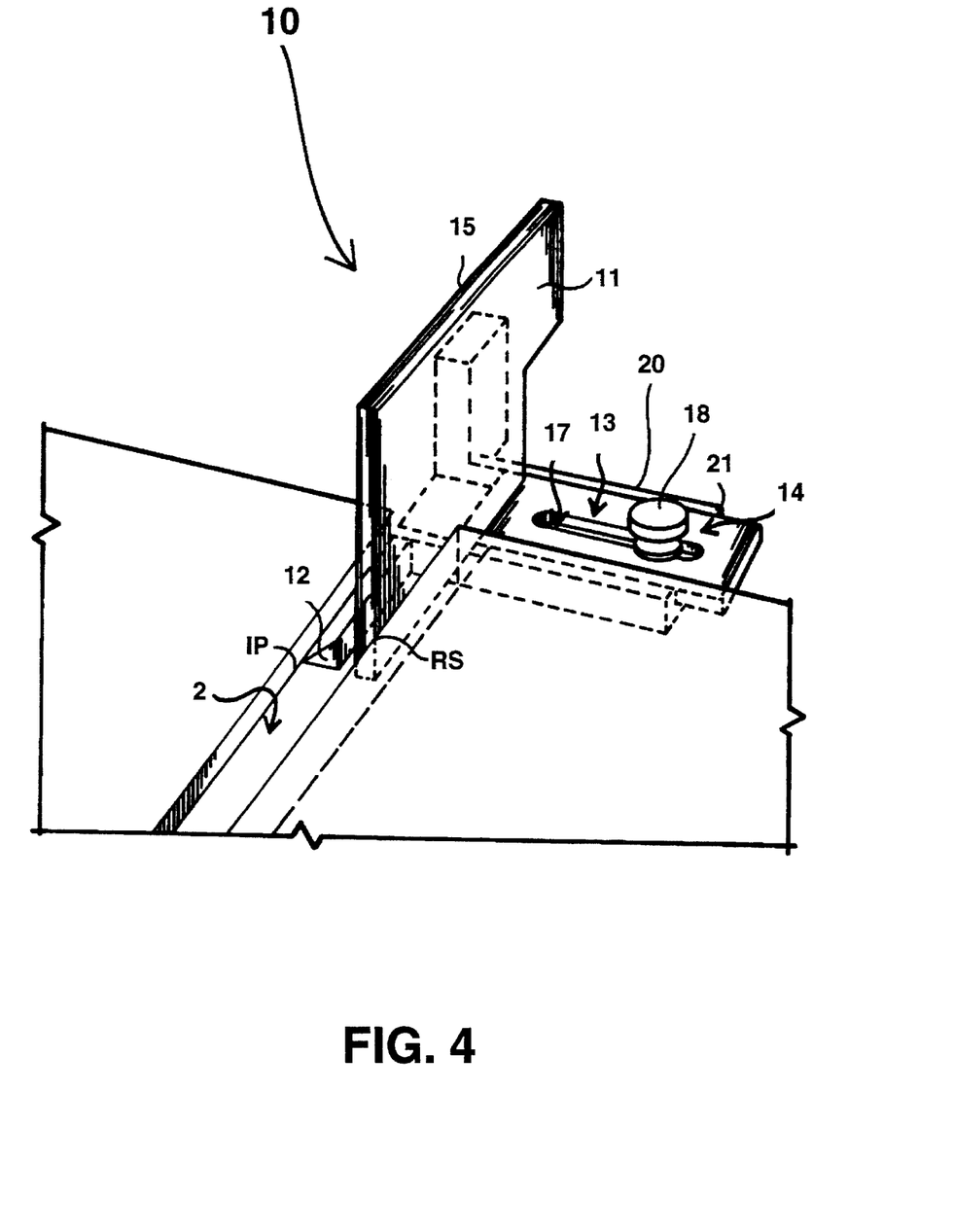
FIG. 4 is a perspective view showing the first embodiment of the dovetail caliper measuring the offset necessary for a particular dovetail mortise.
Figure 5:
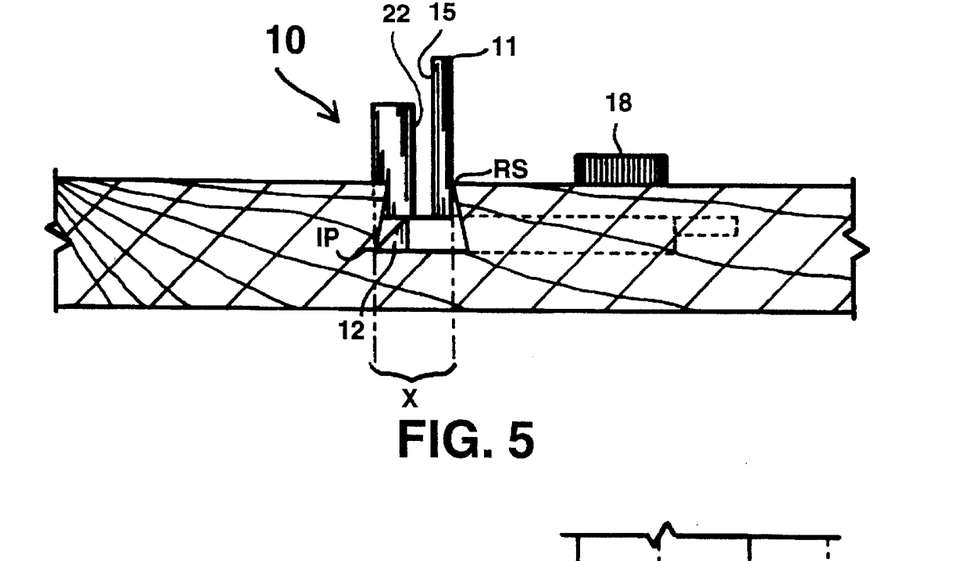
FIG. 5 is a side section view of the first embodiment of a dovetail caliper installed in the dovetail mortise.

In use, after a particular dovetail mortise 2 is formed, shoulder engagement member 11 and interior intersection point engagement member 12 are inserted into the mortise opening and engaged with base 5. Thumb screw 18 is loosened so that slide plate 16 can slide with respect to guide member 20. Slide plate 16 is then pulled rearward, displacing interior intersection point engagement member 12 with respect to shoulder engagement member 11. This displacement is continued until, with the rear surface of shoulder engagement member 11 firmly in contact with reference shoulder RS, the forward most point of interior intersection point engagement member 12 comes into contact with interior intersection point IP. Thumb screw 18 is then tightened to preserve the displacement between the forward most point of interior intersection point engagement member 12 and the rear surface of shoulder engagement member 11. Dovetail offset tenon caliper 10 is then withdrawn from dovetail mortise 2.

Figure 6:
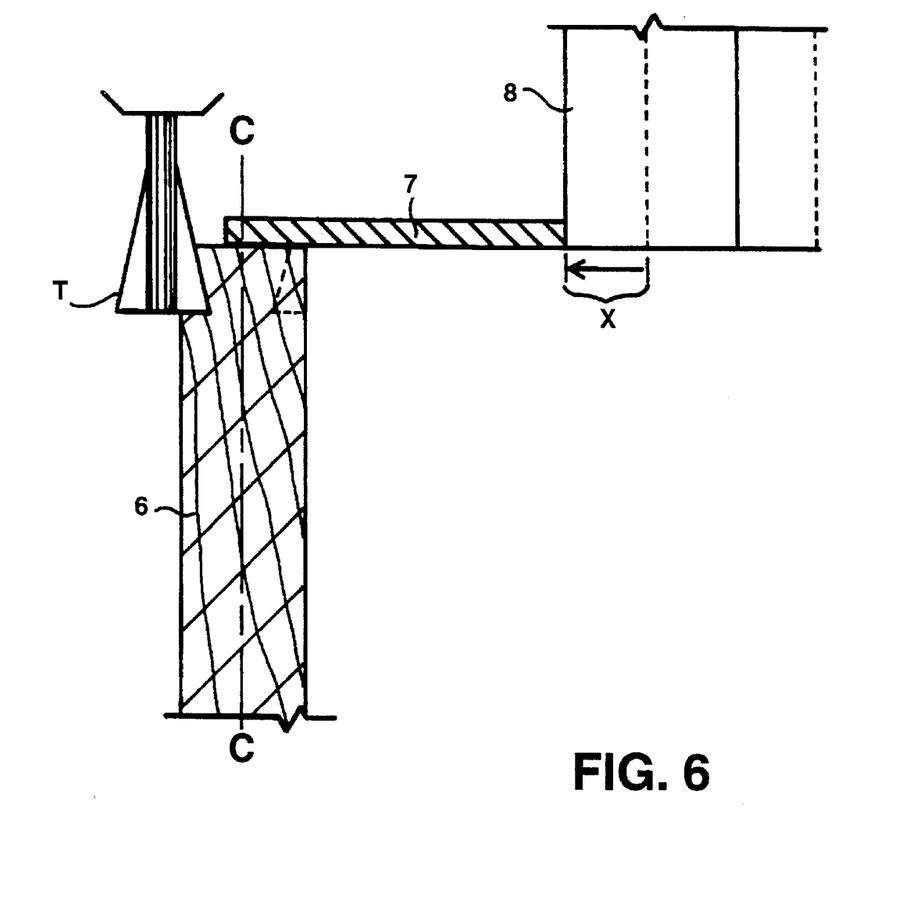
FIG. 6 is a side sectional view illustrating the use of a router and fence to construct the dovetail tenon according to the method of the present invention.
Figure 7:
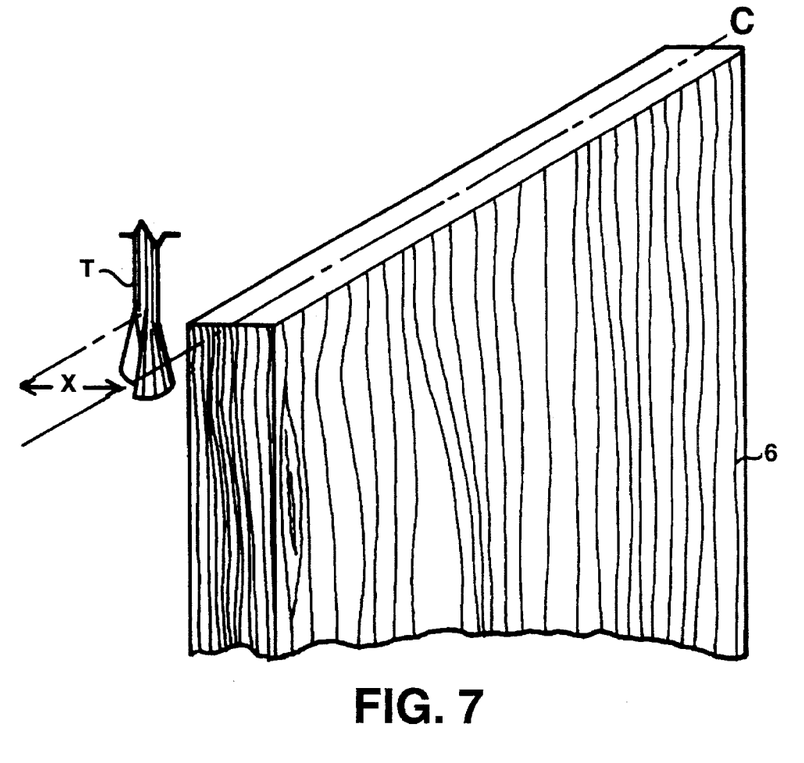
FIG. 7 is a detail perspective view illustrating the method of the present invention.

A dovetail tenon 1 is then constructed to fit the measured dovetail mortise 2 using the offset X measured by caliper 10. An example of this construction is illustrated in FIG. 6 using a standard router having a dovetail cutting bit T in connection with guide fence 8, against which router base 7 is directed. The dotted lines of FIG. 6 illustrate the set point for guide fence 8 if the router were going to cut a dovetail mortise down the centerline C of stock 6. To cut a tenon, the router must be offset from the centerline, cutting one side of the tenon at a time. Once the first side is cut, stock 6 is rotated to cut the second side. Using the invention, the necessary offset is transferred from dovetail tenon offset caliper 10 to the fence setting. The first side is then cut, the board flipped over and the second side is cut.

Figure 9:
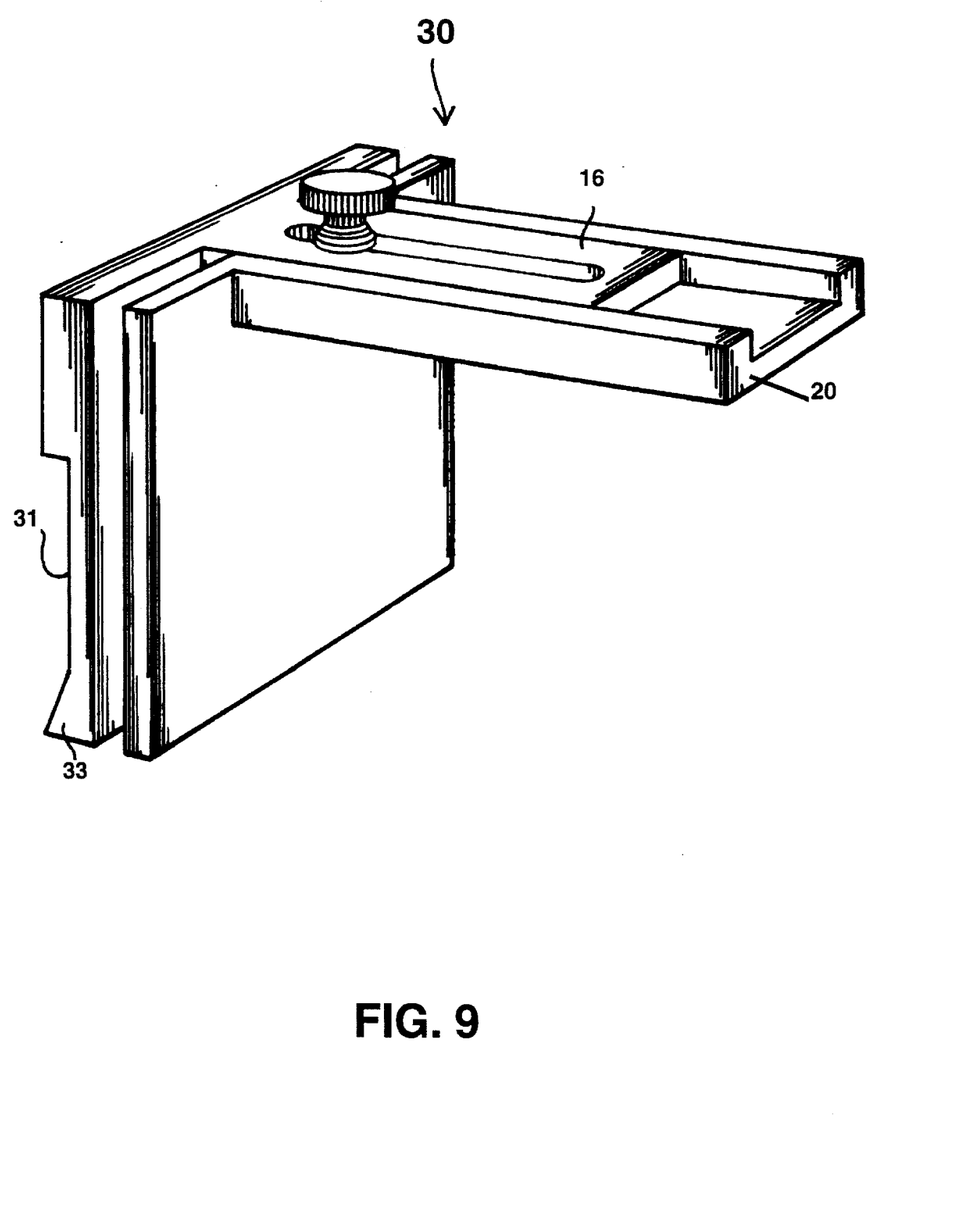
FIG. 9 is a perspective view of a second embodiment of the dovetail tenon offset caliper.
Figure 10:
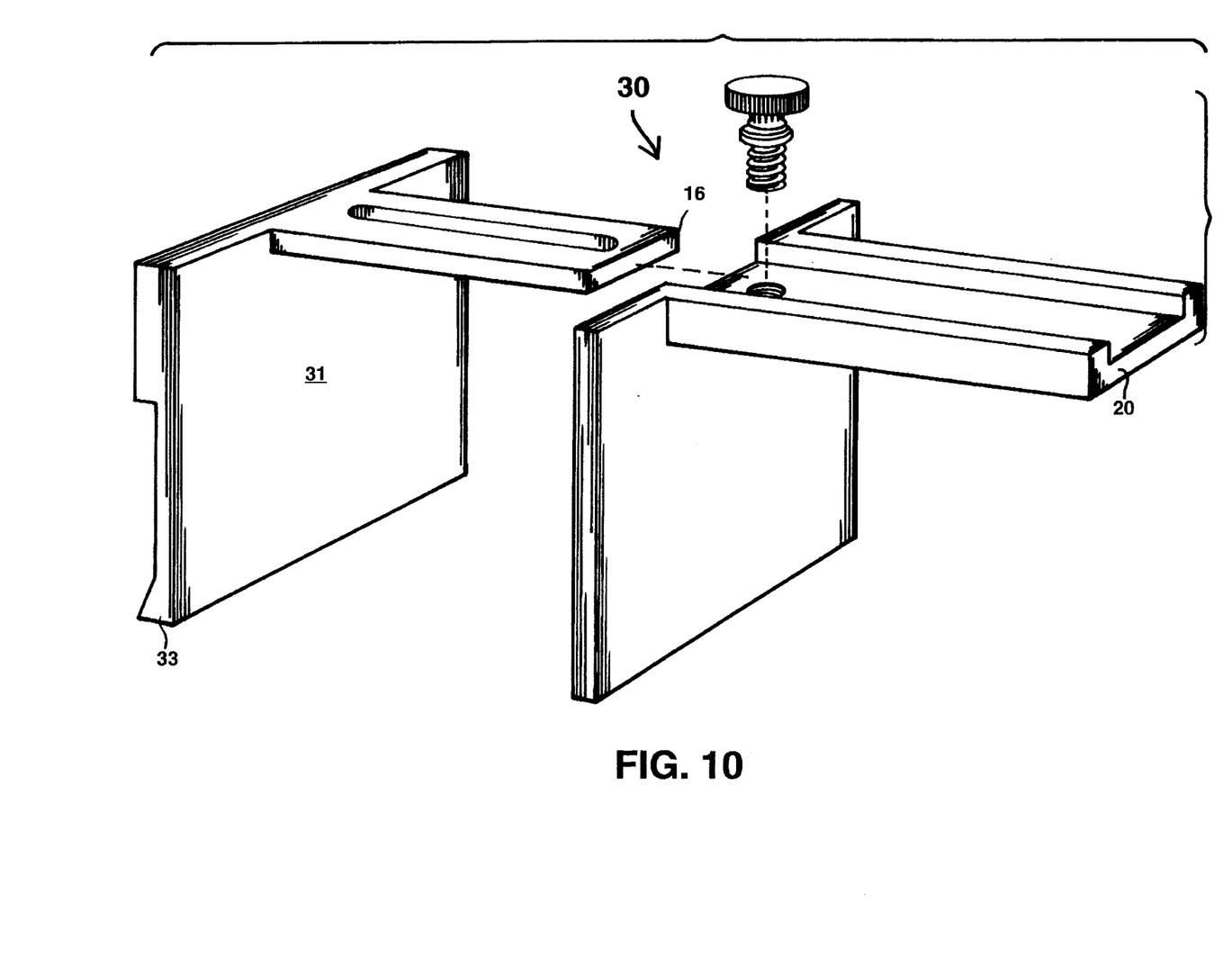
FIG. 10 is an exploded perspective view of the second embodiment of the dovetail tenon offset caliper.

FIGS. 9 and 10 show a second embodiment of the dovetail tenon offset caliper, here designated as 30. Caliper 30 uses a toe plate 31, with a beveled toe extension 32 at the base of its front surface, in place of toe arm 19 in the first embodiment. Additionally, slide plate 16 displaces toe plate 31 while guide member 20 carries heel plate 15.

Figure 11:
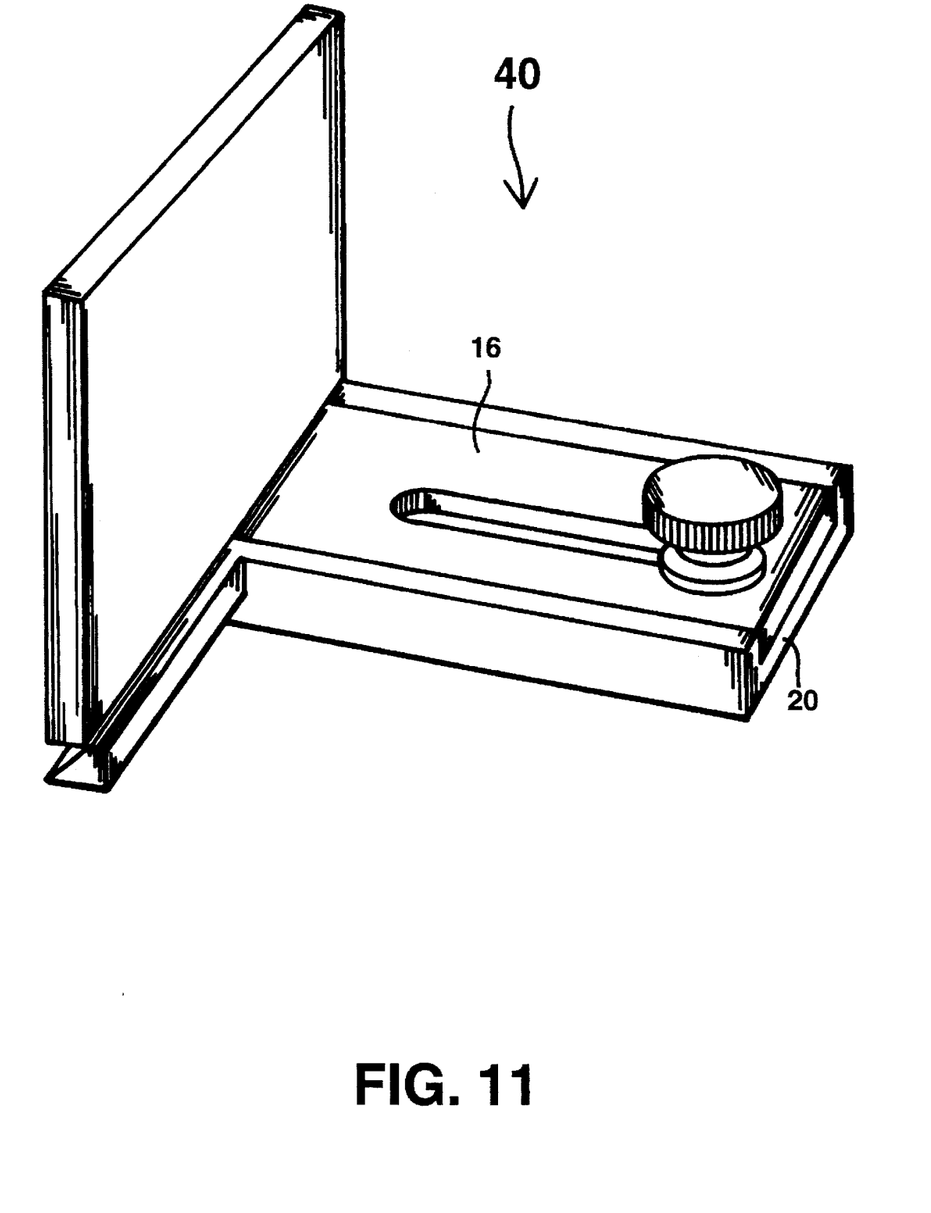
FIG. 11 is a perspective view of a third embodiment of the dovetail tenon offset caliper.
Figure 12:
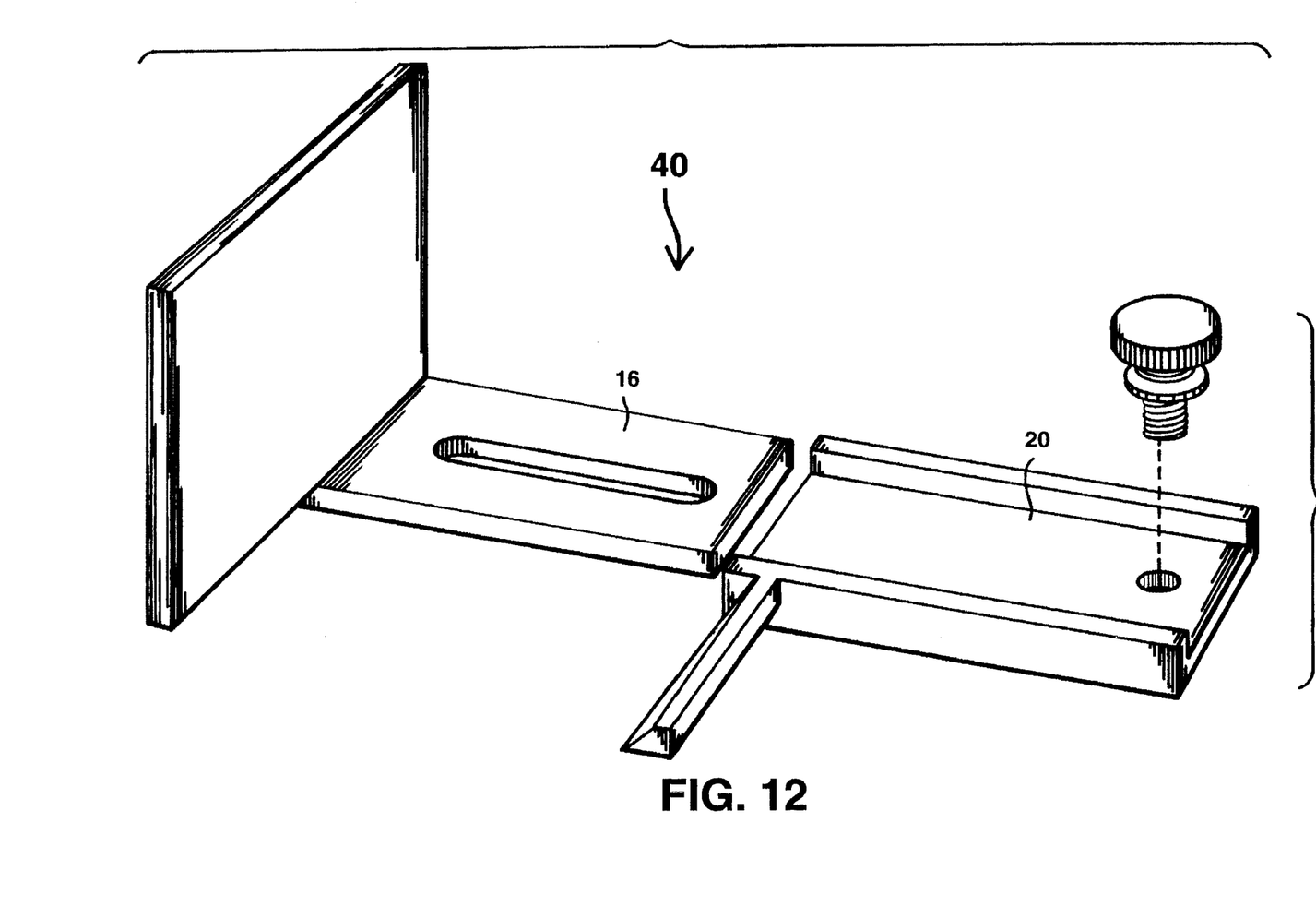
FIG. 12 is an exploded view of the third embodiment of the dovetail tenon offset caliper.

FIGS. 11 and 12 show yet another variation of the dovetail tenon offset caliper, here designated as 40. Caliper 40 is essentially identical to the first embodiment with the exception of the elimination of the rest block.

While there is shown and described the present preferred embodiment of the invention, it is to be distinctly understood that this invention is not limited thereto but may be variously embodied to practice within the scope of the following claims.

I claim:

1. A device for measuring the offset from a tenon centerline necessary to construct a dovetail tenon to closely fit a dovetail mortise, the dovetail mortise having a pair of shoulders defining the mortise opening with a wall diverging downwardly from each shoulder, each wall terminating at the base of the mortise at an interior intersection point, the walls forming acute interior angles with respect to the base, which comprises:

a shoulder engagement member having a shoulder engagement surface configured to closely juxtapose an edge of the mortise opening, the edge defining a reference shoulder of the pair of shoulders;

an interior intersection point engagement member having an intersection point engagement surface configured to closely engage the intersection point which is opposite the reference shoulder; and a translation assembly being attached to both the shoulder engagement member and the interior intersection point engagement member, the translation assembly being configured to displace the interior intersection point member with respect to the shoulder engagement member along a line substantially parallel to the mortise base, the perpendicular distance between a first plane perpendicular to the displacement line, the first plane containing the reference shoulder, and a second plane, parallel to the first plane and containing the intersection point, defining the dovetail tenon offset.

2. The device of claim 1 further comprising a locking means cooperating with the translation assembly to lock the shoulder engagement member into place with respect to the interior intersection point engagement member.

3. The device of claim 2 wherein the translation assembly comprises a cooperating guide member and slide plate.

4. The device of claim 3 wherein the shoulder engagement member comprises a heel plate attached to the slide plate and the interior intersection point engagement member comprises a toe arm attached to the guide member.

5. The device of claim 3 wherein the shoulder engagement member comprises a heel plate attached to the guide member and the interior intersection point engagement member comprises a toe plate attached to the slide plate.

6. The device of claim 1 wherein the translation assembly comprises a cooperating guide member and slide plate.

7. The device of claim 6 wherein the shoulder engagement member comprises a heel plate attached to the slide plate and the interior intersection point engagement member comprises a toe arm attached to the guide member.

8. The device of claim 6 wherein the shoulder engagement member comprises a heel plate attached to the guide member and the interior intersection point engagement member comprises a toe plate attached to the slide plate.

9. A method for constructing a dovetail tenon, using a dovetail cutting tool, to closely fit a dovetail mortise, the dovetail mortise having a pair of shoulders defining the mortise opening, one of the shoulders being the reference shoulder, with a wall diverging downwardly from each shoulder, each wall terminating at the base of the mortise at an interior intersection point, the walls forming acute interior angles with respect to the base, which comprises:

measuring, along a line substantially parallel to the mortise base, the perpendicular distance between a first plane perpendicular to the line, the first plane containing the reference shoulder, and a second plane, parallel to the first plane and containing the intersection point, defining the dovetail tenon offset;

offsetting the cutting tool, with respect to a centerline of the tenon to be cut, a distance equal to the measured dovetail offset; and cutting both sides of the tenon.

10. A method for setting the cutting offset on a dovetail cutting tool for constructing a dovetail tenon from a piece of stock, to closely fit a dovetail mortise, the dovetail mortise having a pair of shoulders defining the mortise opening, one of the shoulders being the reference shoulder, with a wall diverging downwardly from each shoulder, each wall terminating at the base of the mortise at an interior intersection point, the walls forming acute interior angles with respect to the base, which comprises:

measuring, along a line substantially parallel to the mortise base, the perpendicular distance between a first plane perpendicular to the line, the first plane containing the reference shoulder, and a second plane, parallel to the first plane and containing the intersection point, defining the dovetail tenon offset; and offsetting the cutting tool, with respect to the centerline of the stock to be cut, a distance equal to the measured dovetail offset.

* * * * *